United States Patent [19]

Kempf et al.

[11] Patent Number: 4,779,450
[45] Date of Patent: Oct. 25, 1988

[54] METHOD AND APPARATUS FOR INSTALLING A FLUID PROBE

[75] Inventors: David N. Kempf, Indianapolis; Ford C. Jefferson, Beech Grove, both of Ind.

[73] Assignee: Emhart Industries, Inc., Indianapolis, Ind.

[21] Appl. No.: 161,390

[22] Filed: Feb. 22, 1988

Related U.S. Application Data

[63] Continuation of Ser. No. 861,877, May 12, 1986, abandoned.

[51] Int. Cl.⁴ ............................................. G01M 3/32
[52] U.S. Cl. ....................................................... 73/49.2
[58] Field of Search ................... 73/49.2, 49.3, 40.5 R, 73/40; 254/134.3 FT

[56] References Cited

U.S. PATENT DOCUMENTS 4,083,532  4/1978  Pola ..................... 254/134.3 FT

FOREIGN PATENT DOCUMENTS 2311953  9/1974  Fed. Rep. of Germany ....... 73/49.3
2329525  1/1975  Fed. Rep. of Germany ....... 73/49.3

Primary Examiner—John Chapman
Assistant Examiner—Joseph W. Roskos
Attorney, Agent, or Firm—Carl A. Forest

[57] ABSTRACT

A fluid detector comprises a probe, a probe cap and an electric cable connecting the probe and cap. A stainless steel lead is attached to the end of the probe opposite the cable. The distal end of an electrician's fish is inserted through an entry port into the space between the walls of a double-walled tank and run around the tank until it returns to the entry port. The end of the fish is engaged by a hook, pulled from the tank, and connected to the probe lead. The electric probe cable has a length equal to the distance from the entry port to the desired probe position. The fish lead and probe are pulled around the tank until the distal end of the fish emerges from the tank. The lead is disengaged from the fish and passed through the cap. The slack in the lead is taken in, and the lead is attached to the cap. Alternatively, the distal end of the fish may be inserted into a channel in the probe casing, the probe inserted into the tank and directed into position, and the fish disengaged from the probe and removed from the tank.

12 Claims, 2 Drawing Sheets

METHOD AND APPARATUS FOR INSTALLING A FLUID PROBE

This application is a continuation of application Ser. No. 861,877, filed May 12, 1986, now abandoned.

BACKGROUND OF THE INVENTION

1. Field of the Invention

The invention in general relates to fluid detectors and in particular to a method and apparatus for placing a fluid detector probe in confined areas, such as the space between the walls of a double-walled tank.

2. Description of the Prior Art

Fluid detector probes that differentiate between polar and non-polar liquids and gases have been used for some time to detect hydrocarbon pollutants. They have become particularly important in detecting the presence of leaks in tanks containing gasoline or oil. See, for example, U.S. Pat. Nos. 4,116,045 issued to Bronson M. Potter, 4,221,125 issued to John N. Oliver and Louis M. Sandler and 4,442,405 issued to Raymond J. Andrejasich and Ralph A. Perry and U.S. patent application Ser. No. 06/579,431 on an invention of Raymond J. Andrejasich.

While these detector probes have become progressively more reliable, they have not been employed in some locations, such as between the walls of a double-walled tank, where it would be highly useful to detect hydrocarbons. This has been a significant problem in the industry because correction of a leak in the inner wall of a double-walled tank is usually relatively inexpensive, as compared to the cleanup that can be required upon leakage through both walls. Thus a method and apparatus by which such detector probes may be accurately placed between the walls of a double-walled tank is highly desirable.

SUMMARY OF THE INVENTION

It is an object of the invention to provide a method of accurately placing a fluid probe in a confined area, such as between the walls of a double-walled tank.

It is another object of the invention to provide the above object in a method that can be employed by relatively unskilled persons.

It is another object of the invention to provide one or more of the above objects in a method that is simple and inexpensive.

It is still another object of the invention to provide simple and inexpensive apparatus for accurately placing a fluid probe in confined areas, such as between the walls of a double-walled tank.

The invention provides a method for placing a fluid probe between the walls of a double-walled tank comprising the steps of inserting the distal end of a fish through an entry port into the space between the walls of a double-walled tank and running the distal end around the tank until it returns to the entry port, connecting the probe to the distal end of the fish, and pulling the fish from the tank while moving the probe to a position in the lower portion of the tank. Preferably, the step of connecting comprises engaging the distal end of the fish with an engaging member and pulling the end from the tank, then attaching the distal end of the fish to a lead connected to the probe. Preferably, the step of pulling comprises pulling the lead around the tank until its distal end emerges from the tank; and preferably the method further includes the steps of disengaging the fish from the lead and engaging the lead to a cap for closing the tank. Preferably, the step of pulling comprises pulling the lead a distance approximately equal to half the circumference of the tank.

Alternatively, the method of the invention comprises the steps of engaging the probe with the distal end of a fish, inserting the probe and the end of the fish into the space between the tank walls, directing the probe to a position in the lower portion of the tank, disengaging the distal end of the fish from the probe and removing the end of the fish from the tank. Preferably, the step of engaging comprises inserting the distal end of the fish into a channel in the probe.

The invention also provides apparatus for placing a fluid probe through an entry port into a confined area comprising a fish having a distal end, a means attached to the probe for releasably engaging the distal end of the fish, and flexible means for spanning and defining the distance from the entry port to the desired location of the probe. Preferably, the flexible means comprises an electric cable attached to the probe. Preferably, the apparatus also includes a means for capping the entry port, and preferably the means for capping includes a means for receiving the means for releasably engaging. Alternatively, the probe includes a probe casing and the means for releasably engaging comprises a channel means in the casing for receiving the distal end of the fish.

The method and apparatus of the invention permits hydrocarbon to be detected in areas not previously possible. Numerous other features, objects and advantages will become apparent from the following detailed description when used in conjunction with the accompanying drawings.

DESCRIPTION OF THE PREFERRED EMBODIMENT

Figure 1:
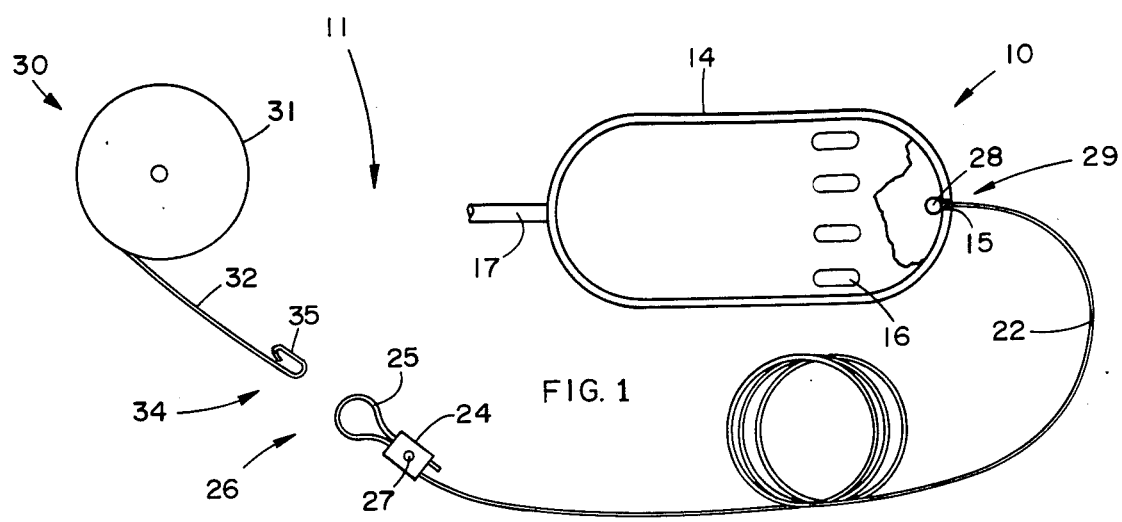
FIG. 1 shows a partially cut away view of the preferred embodiment of a probe and the apparatus for installing the probe according to the invention.
Figure 3:
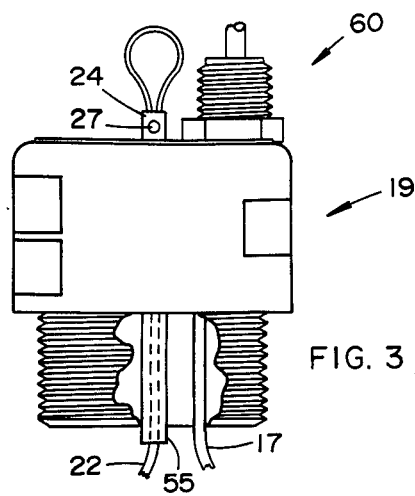
FIG. 3 shows detail of the probe cap and lead.

Directing attention to FIG. 1, the preferred embodiment of a fluid probe 10 and apparatus 11 for installing the probe according to the invention are shown. The probe 10 includes a casing 14 having a slot 15 in one end and having openings 16 which permit fluid exterior to the casing to enter the interior of the casing where fluid monitoring elements (not shown) sense the fluid. The apparatus 11 for installing the probe 10 includes a probe lead 22 and a cable tie 24 having a screw 27 which secures a loop 25 in the distal end 26 of lead 22. A ball 28 is attached to the other end 29 of lead 22 and the lead is attached to the casing by slipping the end 29 in slot 15 in casing 14 so that ball 28 is within the casing and prevents the lead from pulling out. Probe lead 22 is preferably of a length equal to or greater than half the circumference of the tank 40 into which the probe is to be installed. The apparatus 11 also includes fish 30 having a spool 31 in which is wound fish member 32 having a distal end 34 which is formed into a clasp 35. Apparatus 11 also includes electric cable 7 which connects the monitoring elements (not shown) to electronics (not shown) in a probe cap 19 (FIG. 3).

Figure 2A:
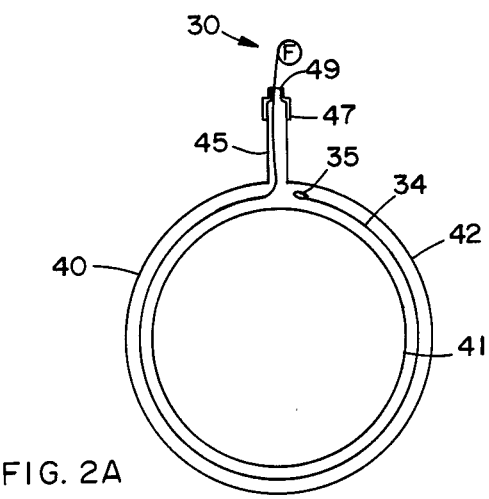
FIGS. 2A through 2D show the preferred method of installing a probe between the walls of a double-walled tank using the apparatus of FIG. 1.
Figure 2B:
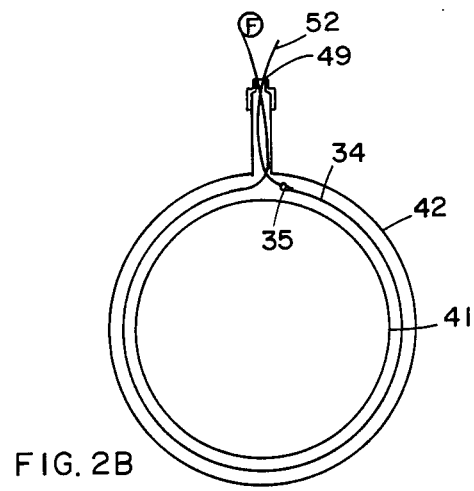
Figure 2C:
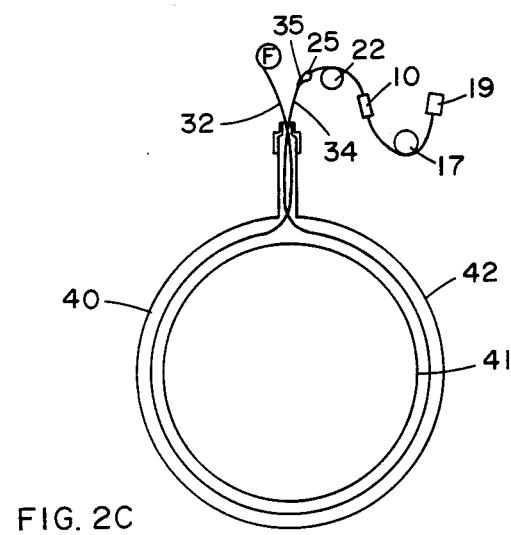

Turning now to FIGS. 2A through 2D, the preferred method of insertion of the probe 10 into a double-walled tank 40 is shown. Tank 40 comprises an inner wall 41 and an outer wall 42 and is shown sectioned through a fill port 45 which includes a threaded end member 47. The distal end 34 of a electrician's fish 30 is inserted in the tank opening 49 and is run around the tank until end 34 returns to the entry port 45 (FIG. 2A). A hook 52 or other engaging member is inerted through opening 49 (FIG. 2B), the clasp 35 on end 34 is engaged by hooking it, and the end is then pulled out of the tank opening 49. The loop 25 at the end of the probe lead 22 is connected to the distal end 34 of the fish by means of the clasp 35 (FIG. 2C).

Figure 2D:
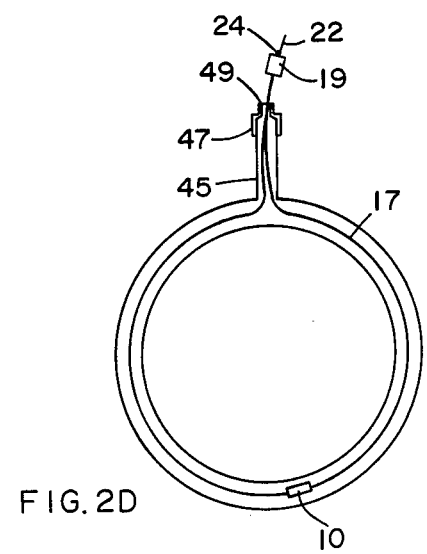

The fish member 32, the probe lead 22 and the probe 10 are then pulled around the tank 40 until the probe is located in the desired position, which will generally be the lowest point in tank 40 (FIG. 2D). The probe may be accurately positioned in several ways. The length of cable 17 may be chosen so that it is approximately equal to the distance from the opening 49 to the desired location. Alternatively, the length of lead 22 may be selected so that the probe will be in proper position when the distal end 26 of the lead emerges from port 45, or the cable 17 or lead 22 may be marked at the desired length. If the cable 17 or lead 22 are marked, they may be cut to the appropriate length once the probe 10 is in position. Once the probe 10 is in the desired position, the lead loop 25 is disconnected from the clasp 35, the set screw 27 is loosened, the cable tie 24 is removed from the lead 22 and the lead 22 and cap 19 are engaged by sliding lead end 26 through a lead guide 55 in the probe cap 19 (FIG. 2D and shown in detail in FIG. 3). Tie 24 is then replaced on the lead wire 22, the cap 19 is installed on the threaded end element 47 of port 45, the slack in the lead is pulled up, and the set screw 27 in tie 24 is tightened down with a wrench. An electric cable connector 60 may be attached to connect the probe electronics in cap 19 to a central monitoring station (not shown).

Figure 4:
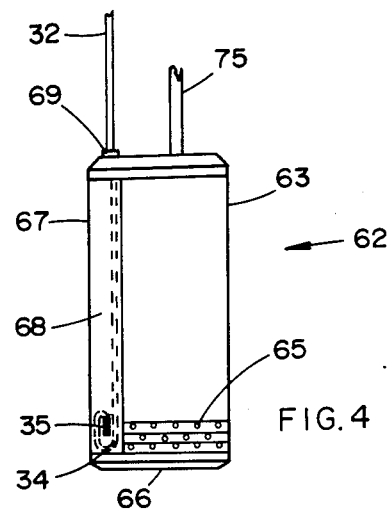
FIG. 4 shows an alternative embodiment of a probe and apparatus for installing the probe according to the invention.
Figure 5A:
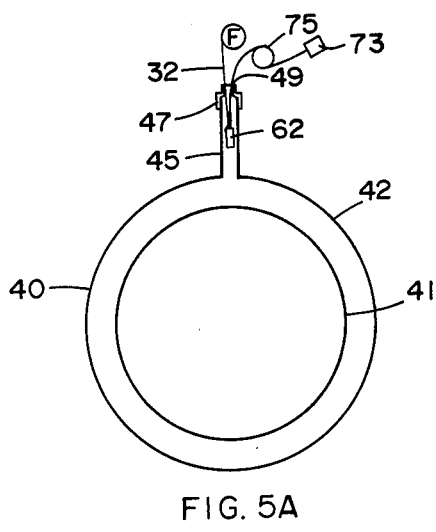
FIGS. 5A through 5C show an alternative method of installing a probe using the apparatus of FIG. 4.
Figure 5B:
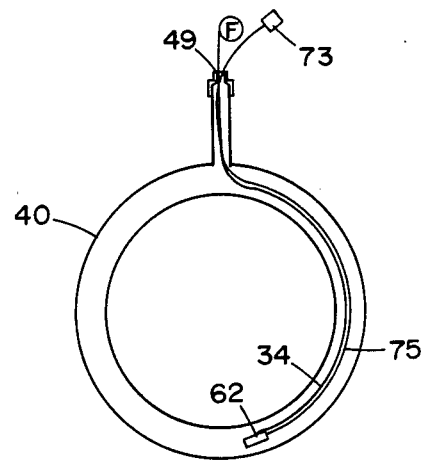

An alternative embodiment of a probe according to the invention is shown in FIG. 4. The casing 63 of this probe 62 is more rectangular, has smaller openings 65, which are placed near end 66, and includes an extension 67 of the casing which forms a channel 68 for receiving the distal end 34 of fish member 32 which is inserted through opening 69. The probe of FIG. 4 may be installed in a tank 40 in an alternative method shown in FIGS. 5A through 5C. The probe 10 is engaged by the fish distal end 34 by inserting end 34 into channel 68 in probe casing 63 (FIG. 5A) and the distal end 34 and probe casing 63 are inserted through tank opening 49 and pushed down port 45. Probe 62 is then directed into position in the tank (FIG. 5B). The position may be accurately determined by providing a cable 75 of a length equal to the distance from opening 49 to the bottom of the tank or other desired position, or by marking the length on the cable, cutting it, and connecting it to cap 19 after insertion of the probe into the tank.

The fish end 34 is then disengaged from probe 10 and fish end 34 is withdrawn from the tank and the tank port 45 is closed with probe cap 73. In this embodiment, the probe cable 75 may be used to withdraw the probe casing 63 from the tank 40 if it is necessary to retrieve the probe.

Figures 5C, 6A:
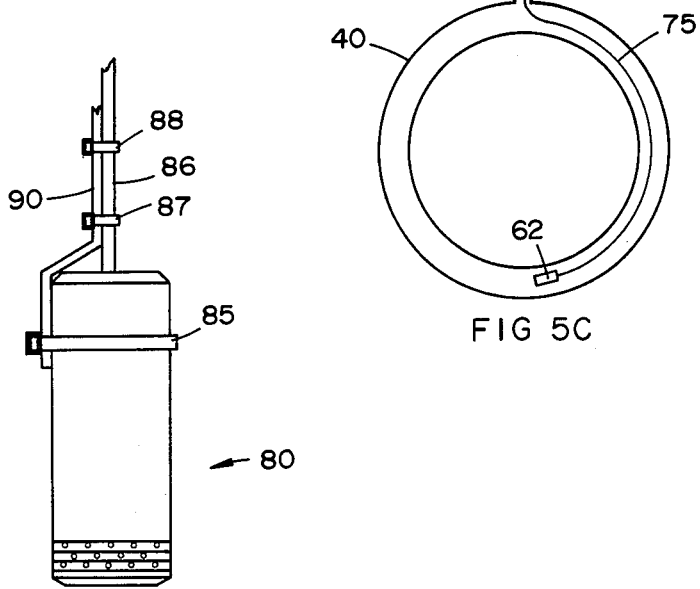
FIGS. 6A and 6B show another alternative embodiment of a probe and apparatus for installing the probe according to the invention.
Figure 6B:
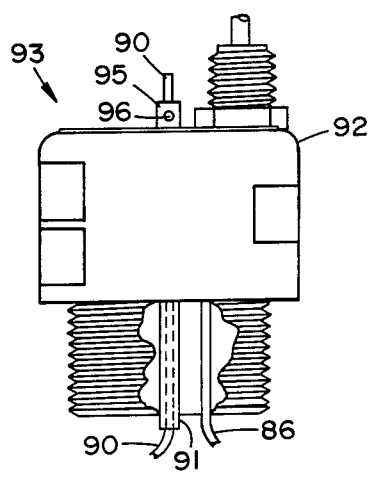

Another embodiment of a probe 80 according to the invention is shown in FIG. 6A. This embodiment is similar to the embodiment of FIG. 4, except that the casing extension 67 has been eliminated. This embodiment is installed using a flexible rod 90 which is fastened to probe 80 by means of bracket 85 and to the probe cable 86 by clamps 87 and 88. This probe may be inserted into a confined area by pushing it into place with rod 90. Rod 90 is preferably of a length approximately equal to the distance from the port 45 to the desired location of the probe 100. The connection of rod 90 to probe cap 92 is shown in FIG. 6B. A means 93 for engaging the rod 90 and probe cap 92 comprises guide 91, clamp 95 and screw 96. The rod 90 may be slid through guide 91 in probe cap 92 and clamp 95 may be attached by tightening screw 96 to seat rod 90 in cap 92 and prevent it from slipping back through guide 90.

It is noted that both the tie 27 together with the end 26 of lead 22 (FIG. 1) and the channel 68 in casing 63 (FIG. 4) are a means for releasably engaging the distal end of fish 30. Also, depending on the embodiment, cables 17, 75 and 86, lead 22, and rod 90 all may be considered to be a flexible means for spanning and defining the distance from the entry port 45 to the desired location of the probe; by "defining the distance" is meant that its length determines the location of the probe. It is also noted that the means for fishing 30 may be any means that is sufficiently rigged to permit the distal end 34 to be directed, yet sufficiently flexible to permit it to bend through a confined area such as the tank 40.

A novel method and apparatus for placing a fluid probe in a confined area, such as between the walls of a double-walled tank has been described. Although the invention has been described in terms of specific embodiments this is not intended to limit the invention. It is evident that those skilled in the art may now make many uses and modifications of the embodiments described, without departing from the inventive concepts. For example, other equivalent steps or parts may be used, or additional steps and parts may be added. Other types of fish means 30 may be used. Consequently, the invention is to be construed as embracing each and every novel feature and novel combination of features present in the detector described.

What is claimed is:

1. A method of placing a fluid probe between the walls of a double-walled tank comprising the steps of:
   inserting the distal end of a fish through an entry port and into the space between the walls of a double-walled tank and running said distal end around the tank until it returns to said port;
   connecting said distal end of said fish to a lead attached to said probe, said lead having a length greater than or equal to the distance from said port to the desired position of said probe; and
   pulling said distal end of said fish from said tank while moving said probe to a position in the lower portion of said tank.

2. The method of claim 1 wherein said step of connecting includes the step of engaging said distal end of said fish with an engaging member and pulling said distal end from said tank.

3. The method of claim 1 wherein said step of pulling comprises pulling said lead around said tack until its distal end emerges from said port, and further including the steps of passing said distal end of said lead through a cap for closing said port, closing said port with said cap, and securing said distal end of said lead so that it cannot pass back through said cap.

4. A method of placing a probe between the walls of a double-walled tank comprising the steps of:
 engaging said probe with the distal end of a fish by inserting said distal end of said fish into a channel in said probe;
 inserting said probe and said end of said fish into the space between the walls of said tank and directing the probe to a position in the lower portion of said tank; and
 disengaging said distal end of said fish from said probe and removing the fish from said tank.

5. Apparatus for placing a fluid probe in a confined area through an entry port, said apparatus comprising:
 a fish having a distal end,
 a means attached to said probe for releasably engaging said distal end of said fish; and
 flexible means for spanning and defining the distance from said entry port to the desired location of said probe.

6. The apparatus of claim 5 wherein said flexible means comprises an electric cable attached to said probe.

7. The apparatus of claim 5 wherein said flexible means comprises a probe lead attached to said probe.

8. The apparatus of claim 7 wherein said means for releasably engaging comprises the distal end of said probe lead and a cable tie.

9. The apparatus of claim 5 wherein said probe includes a probe casing and said means for releasably engaging comprises a channel means in said casing for receiving said distal end of said fish.

10. The apparatus of claim 5 and further including a means for capping said entry port.

11. The apparatus of claim 10 wherein said means for capping includes a means for receiving said means for releasably engaging.

12. Apparatus for placing a fluid probe in a confined area through an entry port comprising:
 a flexible rod having a length greater than or equal to the distance from said port to the desired position of said probe
 a means for attaching said flexible rod to said probe;
 an electric cable attached to said probe;
 a probe cap attached to said electric cable; and
 means for engaging said rod and said probe cap.

* * * * *